United States Patent
Fischer

(10) Patent No.: US 8,054,836 B2
(45) Date of Patent: Nov. 8, 2011

(54) DOWNLINK PACKET DATA CONVERGENCE PROTOCOL BEHAVIOR DURING HANDOVER

(75) Inventor: Patrick Fischer, Roissy (FR)

(73) Assignee: LG Electronics Inc., Seoul (KR)

( * ) Notice: Subject to any disclaimer, the term of this patent is extended or adjusted under 35 U.S.C. 154(b) by 749 days.

(21) Appl. No.: 12/140,915

(22) Filed: Jun. 17, 2008

(65) Prior Publication Data

US 2008/0310368 A1 Dec. 18, 2008

Related U.S. Application Data

(60) Provisional application No. 60/944,783, filed on Jun. 18, 2007, provisional application No. 61/025,881, filed on Feb. 4, 2008.

(51) Int. Cl.
*H04L 12/56* (2006.01)

(52) U.S. Cl. .................................... 370/394

(58) Field of Classification Search ................. None
See application file for complete search history.

(56) References Cited

U.S. PATENT DOCUMENTS

| | | | | |
|---|---|---|---|---|
| 5,907,542 A * | 5/1999 | Kuehnel et al. | ............... | 370/331 |
| 2003/0053461 A1 * | 3/2003 | Ross | ............... | 370/394 |
| 2003/0176187 A1 | 9/2003 | Menzel et al. | | |
| 2003/0224786 A1 * | 12/2003 | Lee et al. | ............... | 455/432.1 |
| 2004/0184424 A1 | 9/2004 | Shibata et al. | | |
| 2005/0094586 A1 * | 5/2005 | Zhang et al. | ............... | 370/310 |
| 2005/0243831 A1 * | 11/2005 | Zhang et al. | ............... | 370/394 |
| 2005/0276252 A1 * | 12/2005 | Sizeland et al. | ............... | 370/338 |
| 2006/0221853 A1 * | 10/2006 | Jiang | ............... | 370/252 |
| 2007/0010250 A1 | 1/2007 | Bosch et al. | | |
| 2007/0293224 A1 * | 12/2007 | Wang et al. | ............... | 455/436 |
| 2010/0061243 A1 * | 3/2010 | Yi et al. | ............... | 370/235 |
| 2010/0220660 A1 * | 9/2010 | Coffman | ............... | 370/328 |
| 2010/0227614 A1 * | 9/2010 | Chun et al. | ............... | 455/436 |
| 2010/0251058 A1 * | 9/2010 | Chandra et al. | ............... | 714/751 |
| 2010/0329214 A1 * | 12/2010 | Chun et al. | ............... | 370/331 |

FOREIGN PATENT DOCUMENTS

KR 1020060051924 5/2006

* cited by examiner

*Primary Examiner* — Chirag Shah
*Assistant Examiner* — Amar Persaud
(74) *Attorney, Agent, or Firm* — Lee, Hong, Degerman, Kang & Waimey

(57) ABSTRACT

The present invention relates to maintaining an order of received data units during a handover procedure in a wireless communication system. The present invention includes receiving a plurality of data units from a source station according to a sequence prior to handover to a target base station, wherein each data unit includes a sequence number, receiving at least one data unit having a sequence number after handover from a target base station, and delivering to a higher layer all data units received from the source base station prior to handover and having sequence numbers smaller than a sequence number of the at least one data unit received from the target base station after handover.

20 Claims, 13 Drawing Sheets

Logical channels mapped onto transport channels, seen from the UE side
PRIOR ART Logical channels mapped onto transport channels, seen from the UTRAN side
PRIOR ART UE State Transitions
PRIOR ART 1) S-ENodeB at handover required (X2) (step 1)

2) S-ENodeB at handover command (Uu) (step 3)

3) S-ENodeB at start of data forwarding (step 9)

4) UE after synchronisation to the target cell (step 4)

DOWNLINK PACKET DATA CONVERGENCE PROTOCOL BEHAVIOR DURING HANDOVER

CROSS-REFERENCE TO RELATED APPLICATIONS

This application claims the benefit of earlier filing date and right of priority to U.S. Provisional Applications No. 60/944,783, filed on Jun. 18, 2007 and No. 61/025,881, filed on Feb. 4, 2008 the contents of which are hereby incorporated by reference herein in their entirety.

FIELD OF THE INVENTION

The present invention relates to communicating between a network and a mobile terminal in a wireless communication system, and more particularly, to maintaining an order of data units during a handover procedure.

BACKGROUND OF THE INVENTION

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology. In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology.

In order to achieve rapid and efficient technical development of the UMTS, five technical specification groups (TSG) have been created within the 3GPP for standardizing the UMTS by considering the independent nature of the network elements and their operations. Each TSG develops, approves, and manages the standard specification within a related region. The radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 provides an overview of a UMTS network. The UMTS network includes a mobile terminal or user equipment (UE) 1, a UTRAN 2 and a core network (CN) 3.

The UTRAN 2 includes several radio network controllers (RNCs) 4 and NodeBs 5 that are connected via the Iub interface. Each RNC 4 controls several NodeBs 5. Each NodeB 5 controls one or several cells, where a cell covers a given geographical area on a given frequency.

Each RNC 4 is connected via the Iu interface to the CN 3 or towards the mobile switching center (MSC) 6 entity of the CN and the general packet radio service (GPRS) support Node (SGSN) 7 entity. RNCs 4 can be connected to other RNCs via the Iur interface. The RNC 4 handles the assignment and management of radio resources and operates as an access point with respect to the CN 3.

The NodeBs 5 receive information sent by the physical layer of the UE 1 via an uplink and transmit data to the UE 1 via a downlink. The Node-Bs 5 operate as access points of the UTRAN 2 for the UE 1.

The SGSN 7 is connected to the equipment identity register (EIR) 8 via the Gf interface, to the MSC 6 via the GS interface, to the gateway GPRS support node (GGSN) 9 via the GN interface, and to the home subscriber server (HSS) via the GR interface.

The EIR 8 hosts lists of UEs 1 that are allowed to be used on the network. The EIR 8 also hosts lists of UEs 1 that are not allowed to be used on the network.

The MSC 6, which controls the connection for circuit switched (CS) services, is connected towards the media gateway (MGW) 11 via the NB interface, towards the EIR 8 via the F interface, and towards the HSS 10 via the D interface.

The MGW 11 is connected towards the HSS 10 via the C interface and also to the public switched telephone network (PSTN). The MGW 11 also allows the codecs to adapt between the PSTN and the connected RAN.

The GGSN 9 is connected to the HSS 10 via the GC interface and to the Internet via the GI interface. The GGSN 9 is responsible for routing, charging and separation of data flows into different radio access bearers (RABs). The HSS 10 handles the subscription data of users.

The UTRAN 2 constructs and maintains an RAB for communication between a UE 1 and the CN 3. The CN 3 requests end-to-end quality of service (QoS) requirements from the RAB and the RAB supports the QoS requirements set by the CN 3. Accordingly, the UTRAN 2 can satisfy the end-to-end QoS requirements by constructing and maintaining the RAB.

The services provided to a specific UE 1 are roughly divided into CS services and packet switched (PS) services. For example, a general voice conversation service is a CS service and a Web browsing service via an Internet connection is classified as a PS service.

The RNCs 4 are connected to the MSC 6 of the CN 3 and the MSC is connected to the gateway MSC (GMSC) that manages the connection with other networks in order to support CS services. The RNCs 4 are connected to the SGSN 7 and the gateway GGSN 9 of the CN 3 to support PS services.

The SGSN 7 supports packet communications with the RNCs. The GGSN 9 manages the connection with other packet switched networks, such as the Internet.

FIG. 2 illustrates a structure of a radio interface protocol between a UE 1 and the UTRAN 2 according to the 3GPP radio access network standards. As illustrated in FIG. 2, the radio interface protocol has horizontal layers comprising a physical layer, a data link layer, and a network layer, and has vertical planes comprising a user plane (U-plane) for transmitting user data and a control plane (C-plane) for transmitting control information. The U-plane is a region that handles traffic information with the user, such as voice or Internet protocol (IP) packets. The C-plane is a region that handles control information for an interface with a network as well as maintenance and management of a call. The protocol layers can be divided into a first layer (L1), a second layer (L2), and a third layer (L3) based on the three lower layers of an open system interconnection (OSI) standard model.

The first layer (L1), or physical layer, provides an information transfer service to an upper layer by using various radio transmission techniques. The physical layer is connected to an upper layer, or medium access control (MAC) layer, via a transport channel. The MAC layer and the physical layer exchange data via the transport channel.

The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources. The MAC layer is connected to an upper layer, or the radio link control (RLC) layer, via a logical channel.

Various logical channels are provided according to the type of information transmitted. A control channel is generally used to transmit information of the C-plane and a traffic channel is used to transmit information of the U-plane.

A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH), and a paging control channel (PCCH) or a shared channel control channel.

The BCCH provides information including information utilized by a terminal to access a system. The PCCH is used by the UTRAN to access a terminal.

For the purposes of a multimedia broadcast/multicast service (MBMS) additional traffic and control channels are introduced in the MBMS standard. The MCCH (MBMS point-to-multipoint control channel) is used for transmission of MBMS control information. The MTCH (MBMS point-to-multipoint traffic channel) is used for transmitting MBMS service data. The MSCH (MBMS Scheduling Channel) is used to transmit scheduling information. The different logical channels that exist are listed in FIG. 3.

The MAC layer is connected to the physical layer by transport channels and can be divided into a MAC-b sub-layer, a MAC-d sub-layer, a MAC-c/sh sub-layer, a MAC-hs sub-layer and a MAC-m sublayer according to the type of transport channel being managed. The MAC-b sub-layer manages a BCH (broadcast channel), which is a transport channel handling the broadcasting of system information. The MAC-c/sh sub-layer manages a common transport channel, such as a forward access channel (FACH) or a downlink shared channel (DSCH), which is shared by a plurality of terminals, or in the uplink the radio access channel (RACH). The MAC-m sublayer may handle the MBMS data.

The possible mapping between the logical channels and the transport channels from a UE perspective is given in FIG. 4. The possible mapping between the logical channels and the transport channels from a UTRAN perspective is given in FIG. 5.

The MAC-d sub-layer manages a dedicated channel (DCH), which is a dedicated transport channel for a specific terminal. The MAC-d sublayer is located in a serving RNC (SRNC) that manages a corresponding terminal. One MAC-d sublayer also exists in each terminal.

The RLC layer, depending of the RLC mode of operation, supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity and then creates data units by adding header information thereto. The data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals positioned in a specific cell or cells.

The PDCP layer is located above the RLC layer. The PDCP layer is used to transmit network protocol data, such as the IPv4 or IPv6, effectively on a radio interface with a relatively small bandwidth. For this purpose, the PDCP layer reduces unnecessary control information used in a wired network, a function called header compression.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). Additionally the RRC handles user mobility within the RAN and additional services, such as location services.

The RB signifies a service provided by the second layer (L2) for data transmission between the terminal and the UTRAN. In general, the set up of the RB refers to the process of stipulating the characteristics of a protocol layer and a channel required for providing a specific data service, and setting the respective detailed parameters and operation methods.

The different possibilities that exist for the mapping between the radio bearers and the transport channels for a given UE are not all possible all the time. The UE and UTRAN deduce the possible mapping depending on the UE state and the procedure that the UE and UTRAN are executing. The different states and modes are explained in more detail below, as far as they concern the present invention.

The different transport channels are mapped onto different physical channels. For example, the RACH transport channel is mapped on a given PRACH, the DCH can be mapped on the DPCH, the FACH and the PCH can be mapped on a secondary common control physical channel (S-CCPCH), and the DSCH is mapped on the PDSCH. The configuration of the physical channels is given by RRC signaling exchange between the RNC and the UE.

The RRC mode refers to whether there exists a logical connection between the RRC of the terminal and the RRC of the UTRAN. If there is a connection, the terminal is said to be in RRC connected mode. If there is no connection, the terminal is said to be in idle mode.

Because an RRC connection exists for terminals in RRC connected mode, the UTRAN can determine the existence of a particular terminal within the unit of cells. For example, the UTRAN can determine in which cell or set of cells an RRC connected mode terminal is located and to which physical channel the UE is listening. Thus, the terminal can be effectively controlled.

In contrast, the UTRAN cannot determine the existence of a terminal in idle mode. The existence of idle mode terminals can only be determined by the core network to be within a region that is larger than a cell, for example, a location or a routing area. Therefore, the existence of idle mode terminals is determined within large regions, and in order to receive mobile communication services such as voice or data, the idle mode terminal must move or change into the RRC connected mode. The possible transitions between modes and states are shown in FIG. 6.

A UE in RRC connected mode can be in different states, such as CELL_FACH state, CELL_PCH state, CELL_DCH state, or URA_PCH state. Depending on the state, the UE carries out different actions and listens to different channels.

For example, a UE in CELL_DCH state will try to listen to DCH type of transport channels, among others. DCH types of transport channels include DTCH and DCCH transport channels, which can be mapped to a certain DPCH, DPDSCH or other physical channels.

The UE in CELL_FACH state will listen to several FACH transport channels, which are mapped to a certain S-CCPCH. A UE in PCH state will listen to the PICH channel and the PCH channel, which are mapped to a certain S-CCPCH physical channel.

The main system information is sent on the BCCH logical channel which is mapped on a P-CCPCH (primary common control physical channel). Specific system information blocks can be sent on the FACH channel. When the system information is sent on FACH, the UE receives the configuration of the FACH either on the BCCH that is received on P-CCPCH or on a dedicated channel. When system information is sent on the BCCH (i.e., via the P-CCPCH), then in each frame or set of two frames the SFN (system frame number) is sent which is used in order to share the same timing reference between the UE and the Node-B. The P-CCPCH is sent using the same scrambling code as the P-CPICH (primary common pilot channel), which is the primary scrambling code of the cell. The spreading code that is used by the P-CCPCH is of a fixed SF (spreading factor) 256, and the number is one. The UE knows about the primary scrambling code either by information sent from the network on system information of neighboring cells that the UE has read, by messages that the UE has received on the DCCH channel, or by searching for the P-CPICH, which is sent using the fixed SF 256, the spreading code number 0 and which ransmits a fixed pattern.

The system information comprises information on neighboring cells, configuration of the RACH and FACH transport channels, and the configuration of MICH and MCCH which are channels that are dedicated channels for the MBMS service.

Each time the UE changes the cell it is camping (in idle mode) or when the UE has selected the cell (in CELL_FACH, CELL_PCH or URA_PCH) state, the UE verifies that it has valid system information. The system information is organized in SIBs (system information blocks), a MIB (master information block) and scheduling blocks. The MIB is sent very frequently and gives timing information of the scheduling blocks and the different SIBs. For SIBs that are linked to a value tag, the MIB also contains information on the last version of a part of the SIBs. SIBs that are not linked to a value tag are linked to an expiration timer. SIBs linked to an expiration timer become invalid and need to be reread if the time of the last reading of the SIB is larger than this timer value. SIBs linked to a value tag are only valid if they have the same value tag as the one broadcast in the MIB. Each block has an area scope of validity (cell, PLMN, equivalent PLMN) which signifies on which cells the SIB is valid. A SIB with area scope "cell" is valid only for the cell in which it has been read. A SIB with area scope "PLMN" is valid in the whole PLMN, a SIB with the area scope "equivalent PLMN" is valid in the whole PLMN and equivalent PLMN.

In general UEs read the system information when they are in idle mode, CELL_FACH state, CELL_PCH state or in URA_PCH state of the cells that they have selected or the cell that they are camping on. In the system information, they receive information on neighboring cells on the same frequency, different frequencies and different RAT (radio access technologies). This allows the UE to know which cells are candidates for cell reselection.

MBMS is introduced in the UMTS standard in the Release 6 of the specification (Rel-6). It describes techniques for optimized transmission of MBMS bearer service including point-to-multipoint transmission, selective combining and transmission mode selection between point-to-multipoint and point-to-point bearers. This is used in order to save radio resources when the same content is sent to multiple users, and enables TV-like services. MBMS data can be split into two categories, control plane information and user plane information. The control plane information contains information on the physical layer configuration, transport channel configuration, radio bearer configuration, ongoing services, counting information, scheduling information, and the like. In order to allow UEs to receive this information, MBMS bearer specific control information for the MBMS is sent to the UEs.

The user plane data of MBMS bearers can be mapped onto dedicated transport channels for a point-to-point service which is sent only to one UE, or on a shared transport channel for point to multipoint service which is transmitted to (and received by) several users at the same time.

Point-to-point transmission is used to transfer MBMS specific control/user plane information, as well as dedicated control/user plane information between the network and a UE in RRC connected mode. It is used for the multicast or the broadcast mode of MBMS. DTCH is used for a UE in CELL_FACH and Cell_DCH. This allows existing mappings to transport channels.

To allow cell resources to be used in an optimized manner, a function called counting has been introduced in MBMS applications. The counting procedure is used to determine how many UEs are interested in the reception of a given service. This is done by using the counting procedure shown in FIG. 7.

For example, a UE that is interested in a certain service receives information of the availability of a MBMS service. The network can inform the UE that it should indicate to the network its interest in the service in the same way such as by transmitting the "access information" on the MCCH channel. A probability factor included in the access information message determines that an interested UE will only respond with a given probability. In order to inform the network that the UE is interested in a given service, the UE will send to the network the RRC connection setup message or the cell update message in the cell that the UE has received the counting information. This message may potentially include an identifier indicating the service that the UE is interested in.

In the case that the network operates on several frequencies, when a UE is camping on one frequency, and a MBMS service is transmitted on a different frequency, a UE may not be aware of the fact that a MBMS service is transmitted in the different frequency. Therefore a frequency convergence procedure allows the UE to receive information in frequency A that indicates in a frequency B that a given service is available.

In general, an MBMS point-to-multipoint Control Channel (MCCH) is a logical channel used for a point-to-multipoint downlink transmission of control plane information between a network and UEs in RRC Connected or Idle Mode. The control plane information on MCCH is MBMS specific and is sent to the UEs in a cell with an activated MBMS service. The MCCH can be sent in the S-CCPCH carrying the DCCH of the UEs in CELL_FACH state, or in a standalone S-CCPCH, or in the same S-CCPCH with MTCH.

The MCCH is mapped to a specific FACH in the S-CCPCH as indicated on the BCCH. In case of soft combining, the MCCH is mapped to a different S-CCPCH (CCTrCH in TDD) than MTCH. Reception of paging has priority over the reception of the MCCH for Idle mode and URA/CELL_PCH UEs. The configuration of the MCCH (modification period, repetition period, etc.) is configured in the system information sent on the BCCH.

In general, an MBMS point-to-multipoint Traffic Channel (MTCH) is a logical channel used for a point-to-multipoint downlink transmission of user plane information between a network and UEs in RRC Connected or Idle Mode. The user plane information on MTCH is MBMS Service specific and is sent to the UEs in a cell with an activated MBMS service. The MTCH is mapped to a specific FACH in the S-CCPCH as indicated on the MCCH.

In general, an MBMS point-to-multipoint Scheduling Channel (MSCH) is a logical channel used for a point-to-multipoint downlink transmission of an MBMS service transmission schedule between a network and UEs in RRC Connected or Idle Mode. Control plane information on MSCH is MBMS service and S-CCPCH specific and is sent to the UEs in a cell receiving MTCH. An MSCH is sent in each S-CCPCH carrying the MTCH. The MSCH is mapped to a specific FACH in the S-CCPCH as indicated on the MCCH. Due to different error requirements, the MSCH is mapped to a FACH different from the MTCH.

In general, FACH is used as a transport channel for MTCH, MSCH and MCCH. Moreover, S-CCPCH is used as a physical channel for FACH carrying the MTCH, MSCH or MCCH.

In general, the following connections between logical channels and transport channels exist only in downlink: 1) MCCH can be mapped to FACH; 2) MTCH can be mapped to FACH; and 3) MSCH can be mapped to FACH. The mappings as seen from the UE and UTRAN sides are shown in FIG. 8 and FIG. 9, respectively.

For MCCH, the RLC mode to be employed is UM-RLC, with required enhancements to support out-of-sequence SDU delivery. A MAC header is used for logical channel type identification.

For MTCH, the RLC mode to be employed is UM-RLC, with required enhancements to support selective combining. Quick repeat may be used in RLC-UM. A MAC header is used for logical channel type identification and MBMS service identification.

For MSCH, the RLC mode to be employed is UM-RLC. A MAC header is used for logical channel type identification.

MBMS notification utilizes an MBMS specific PICH called an MBMS Notification Indicator Channel (MICH) in a cell. Coding for the MICH is defined in Stage-3 physical layer specifications.

In general, MCCH information is transmitted based on a fixed schedule, wherein the schedule identifies the TTI (Transmission Time interval), i.e., multiple of frames containing the beginning of the MCCH information. The transmission of the MCCH information can take a variable number of TTIs, and the UTRAN preferably transmits the MCCH information in consecutive TTIs. The UE will continue to receive the S-CCPCH until: 1) the UE receives all of the MCCH information; 2) the UE receives a TTI that does not include any MCCH data; or 3) information contents indicate that further reception is not required (e.g., no modification to the desired service information).

Based on this behavior, the UTRAN can repeat the MCCH information following a scheduled transmission in order to improve reliability. The MCCH schedule is common for all services.

All MCCH information will be transmitted periodically based on a "repetition period". A "modification period" is defined as an integer multiple of the repetition period. MBMS ACCESS INFORMATION may be transmitted periodically based on an "access info period", which is an integer divider of the "repetition period". The values for the repetition period and modification period are given in the system information of the cell in which MBMS is sent.

MCCH information is split into critical and non-critical information. The critical information is made up of MBMS NEIGHBORING CELL INFORMATION, MBMS SERVICE INFORMATION and MBMS RADIO BEARER INFORMATION. The non-critical information corresponds to MBMS ACCESS INFORMATION. Changes to the critical information are applied at the first MCCH transmission of a modification period and at the beginning of each modification period. The UTRAN transmits MBMS CHANGE INFORMATION including MBMS services IDs whose MCCH information is modified at that modification period. The MBMS CHANGE INFORMATION is repeated at least once in each repetition period of that modification period. Changes to non-critical information can take place at any time.

FIG. 10 illustrates the schedule with which the MBMS SERVICE INFORMATION and RADIO BEARER INFORMATION is transmitted. Different block patterns indicate potentially different MCCH content.

In order to increase coverage, a UE which is located between different cells can receive the same MBMS services from different cells at the same time, and combine the received information as shown in FIG. 11. In this case, the UE reads the MCCH from a cell it has selected based on a certain algorithm.

Referring to FIG. 11, on the MCCH from the selected cell (e.g., cell A-B), the UE receives information on a service that the UE is interested in. This information contains information related to the configuration of physical channels, transport channels, an RLC configuration, a PDCP configuration, etc. of the current cell, and neighboring cells that the UE might be able to receive (e.g., cell A-A and cell B). In other words, the received information contains information that the UE needs in order to receive an MTCH carrying a service that the UE is interested in cells A-A, A-B and B.

When the same service is transported on different cells, the UE may or may not be able to combine the service from the different cells. In case that combining is possible, the combining is performed at different levels: 1) no combining possible; 2) selective combining at RLC level; and 3) L1 combining at physical level.

Selective combining for an MBMS point-to-multipoint transmission is supported by RLC PDU numbering. Therefore, selective combining in the UE is possible from cells providing similar MBMS RB bit rates, provided that de-synchronization between MBMS point-to-multipoint transmission streams does not exceed the RLC re-ordering capability of the UE. Thus, there exists one RLC entity in the UE side.

For selective combining, there exists one RLC entity per MBMS service utilizing a point-to-multipoint transmission in the cell group of the CRNC. All cells in the cell group are under the same CRNC. In case de-synchronization occurs between MBMS transmissions in neighboring cells belonging to an MBMS cell group, the CRNC may perform re-synchronization actions enabling UEs to perform the selective combining between these cells.

For time division duplexing (TDD), selective combining and soft combining can be used when Node-Bs are synchronized. For frequency division duplexing (FDD), soft combining can be used when Node-Bs are synchronized inside a UE's soft combining reception window, and the data fields of the soft combined S-CCPCHs are identical during soft combining moments.

When selective or soft combining is available between cells, the UTRAN sends MBMS NEIGHBORING CELL INFORMATION containing the MTCH configuration of the neighboring cells available for selective or soft combining. When partial soft combining is applied, the MBMS NEIGHBORING CELL INFORMATION contains an L1-combining schedule, which indicates the moments in time when the UE may soft combine the S-CCPCH transmitted in neighboring cells with the S-CCPCH transmitted in a serving cell. With MBMS NEIGHBORING CELL INFORMATION, the UE is able to receive an MTCH transmission from neighboring cells without receiving the MCCH of these neighboring cells.

The UE determines the neighboring cell suitable for selective or soft combining based on a threshold (e.g., measured CPICH Ec/No) and the presence of MBMS NEIGHBORING CELL INFORMATION of that neighboring cell. The possibility of performing selective or soft combining is signaled to the UE.

The long-term evolution (LTE) of UMTS is under discussion by the 3rd generation partnership project (3GPP) that standardized UMTS. The 3GPP LTE is a technology for enabling high-speed packet communications. Many schemes have been proposed for the LTE objective including those that aim to reduce user and provider costs, improve service quality, and expand and improve coverage and system capacity.

FIG. 12 illustrates the architecture of an LTE system. Each aGW 115 is connected to one or several access Gateways (aGW) 115. An aGW 115 is connected to another Node (not shown) that allows access to the Internet and/or other networks, such as GSM, UMTS, and WLAN.

The 3GPP LTE requires reduced cost per bit, increased service availability, flexible use of a frequency band, a simple structure, an open interface, and adequate power consumption of a terminal as an upper-level requirement. Generally, The UTRAN 2 corresponds to E-UTRAN (Evolved-UTRAN). The NodeB 5 and/or RNC 4 correspond to e-NodeB (eNB) 105 in the LTE system.

In 3GPP LTE systems, system information (SI) carries different cell and network specific parameters to a UE for successful attachment to a network. The system information also facilitates paging and allows the UE to use different network services. Every cell continually broadcasts its system information on a channel, such as a broadcast control channel (BCCH). Moreover, every UE registering to the network or performing a handover to a particular cell first reads the cell specific information.

Discontinuous Reception (DRX) is a method used in mobile communication to conserve the battery life of the mobile terminal. Generally, the mobile terminal and the network negotiate periods in which data transfer occurs. During other periods, the mobile terminal turns its receiver off and enters a low power state.

SUMMARY OF THE INVENTION

The present invention is related to maintaining an order of data units during a handover procedure in a wireless communication system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for maintaining an order of received data units during a handover procedure in a wireless communication system, the method comprising receiving a plurality of data units from a source base station according to a sequence prior to handover to a target base station, wherein each data unit includes a sequence number, receiving at least one data unit having a sequence number after handover from a target base station, and delivering to a higher layer all data units received from the source base station prior to handover and having sequence numbers smaller than a sequence number of the at least one data unit received from the target base station after handover.

Preferably, the method further comprises delivering all data units received before starting handover which are available sequentially to a higher layer, wherein a sequentially available data unit has a sequence number immediately sequential to a sequence number of a next available data unit or the sequence number of the at least one data unit received from the target base station after starting handover. Preferably, a timer is started at the start of handover, wherein the data units are delivered to the higher layer when the timer expires. Alternatively, the data units are delivered to the higher layer upon receiving an indication from at least one of the source base station and the target base station to deliver the data units.

In accordance with another embodiment of the present invention, a method for maintaining an order of received data units during a handover procedure in a wireless communication system comprises receiving a plurality of data units according to a sequence prior to starting handover, wherein each data unit includes a sequence number, receiving at least one data unit having a sequence number after starting handover, and delivering to a higher layer all data units received prior to starting handover and having sequence numbers smaller than a sequence number of the at least one data unit received after starting handover.

Preferably, the method further comprises delivering all data units received before starting handover which are available sequentially to a higher layer, wherein a sequentially available data unit has a sequence number immediately sequential to a sequence number of a next available data unit or the sequence number of the at least one data unit received after starting handover.

Preferably, a timer is started at the start of handover, wherein the data units are delivered to the higher layer when the timer expires. Alternatively, the data units are delivered to the higher layer upon receiving an indication to deliver the data units.

In accordance with another embodiment of the present invention, a method for maintaining an order of received data units during a handover procedure in a wireless communication system comprises receiving a plurality of data units according to a sequence prior to starting handover, wherein each data unit includes a sequence number, receiving at least one data unit having a sequence number after starting handover, starting a timer at the start of handover, delivering to a higher layer all data units received prior to starting handover and having sequence numbers smaller than a sequence number of the at least one data unit received after starting handover when the timer expires, and delivering all data units received before starting handover which are available sequentially to a higher layer when the timer expires, wherein a sequentially available data unit has a sequence number immediately sequential to a sequence number of a next available data unit or the sequence number of the at least one data unit received after starting handover.

In accordance with another embodiment of the present invention, a method for maintaining an order of data units during a handover procedure in a wireless communication system comprises transmitting a plurality of data units from a source base station to a mobile terminal according to a sequence prior to handover to a target base station, wherein each data unit includes a sequence number, informing the target base station of a highest sequence number of a data unit previously transmitted by the source base station, and transmitting at least one data unit having a sequence number from the target base station to the mobile terminal after handover, wherein the at least one data unit is transmitted from the target base station with regard to the highest sequence number of the data unit previously transmitted by the source base station.

Preferably, the target base station receives information regarding the highest sequence number after handover from at least one of the mobile terminal, and the source base station. In one aspect of the invention, the method further comprises transmitting the at least one data unit from the target base station with a sequence number higher than the highest sequence number of the data unit previously transmitted by the source base station, wherein the at least one data unit has not been previously transmitted, wherein the source base station and the target base station discard all data units that have been previously transmitted.

In another aspect of the invention, the method further comprises forwarding from the source base station to the target base station all unacknowledged data units previously transmitted by the source base station to the mobile terminal, transmitting the forwarded data units from the target base station to the mobile terminal, and transmitting the at least one data unit from the target base station with a sequence number higher than the highest sequence number of the data unit previously transmitted by the source base station, wherein the at least one data unit has not been previously transmitted.

Preferably, the data units forwarded from the source base station are received by the target base station in sequential order according to their respective sequence numbers. Preferably, the target base station discards a data unit having a sequence number that is out-of-sequence with the sequential order of the data units forwarded from the source base station. Preferably, the target base station transmits to the mobile terminal the forwarded data units previously transmitted by the source base station before transmitting the at least one data unit not previously transmitted. Preferably, the target base station transmits data units to the mobile terminal in a sequentially increasing order according to their respective sequence numbers.

In a further aspect of the invention, the method further comprises informing the target base station of a latest sequence number of a data unit previously received by the mobile terminal, determining in the target base station that a sequence number of a forwarded data unit for transmission to the mobile terminal does not sequentially correspond with the latest sequence number of the data unit previously received by the mobile terminal, and removing the sequence number of the forwarded data unit and transmitting the forwarded data unit out-of-sequence from the target base station to the mobile terminal if a data unit sequentially corresponding with the latest sequence number of the data unit previously received by the mobile terminal is not received by the target base station before a predetermined time elapses.

In yet another aspect of the invention, the method further comprises informing the target base station of a latest sequence number of a data unit previously received by the mobile terminal, determining in the target base station that a sequence number of a forwarded data unit for transmission to the mobile terminal does not sequentially correspond with the latest sequence number of the data unit previously received by the mobile terminal, and discarding the forwarded data unit.

In accordance with another embodiment of the present invention, a method for maintaining an order of received data units during a handover procedure in a wireless communication system comprises receiving a plurality of data units according to a sequence prior to starting handover, wherein each data unit includes a sequence number, starting a timer at the start of handover, and delivering all data units received before starting handover that are not in sequence to a higher layer when the timer expires.

In accordance with another embodiment of the present invention, a method for detecting an error in the order of received data units in a wireless communication system comprises receiving a plurality of data units according to a sequence, wherein each data unit includes a sequence number, wherein no error occurs if a currently received data unit has a sequence number within an interval from a last received data unit sequence number to a predetermined sequence number after the last received data unit sequence number, and wherein an error occurs if the currently received data unit has a sequence number beyond the interval from the last received data unit sequence number to the predetermined sequence number after the last received data unit sequence number.

In accordance with another embodiment of the present invention, a method for maintaining an order of data units during a handover procedure in a wireless communication system comprises transmitting a plurality of data units according to a sequence from a source base station to a mobile terminal, wherein each data unit includes a sequence number, transmitting a handover request from a source base station to a target base station, and transmitting from the source base station to the target base station information related to an appropriate sequence number to be used by the target base station for transmission, wherein the target base station determines the appropriate sequence number for transmission using the information from the source base station.

Preferably, the information comprises one of a next sequence number to be used by the target base station for transmission, a highest sequence number of a data unit previously transmitted by the source base station, and a timestamp and an expected data rate/sequence number rate. Preferably, the appropriate sequence number is greater than a highest sequence number of a data unit previously transmitted by the source base station.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
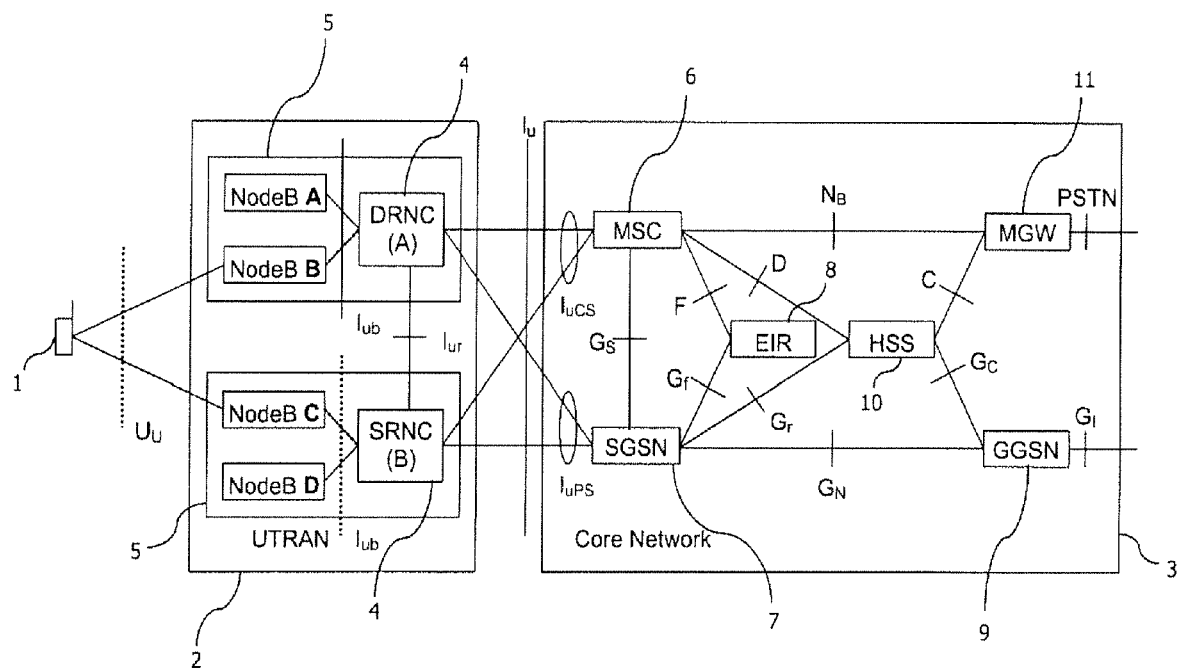
FIG. 1 illustrates a conventional UMTS network.
Figure 2:
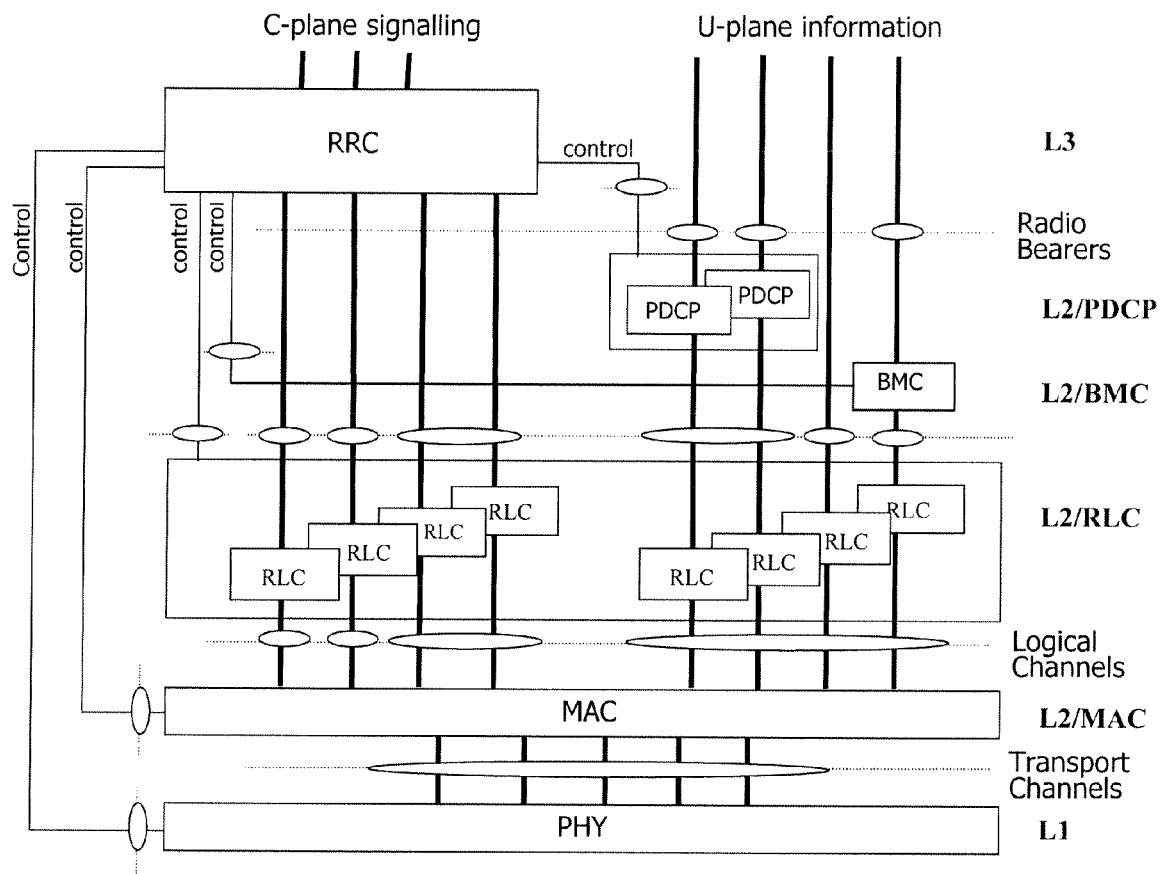
FIG. 2 illustrates a conventional radio interface protocol between a UE and UTRAN.
Figure 3:
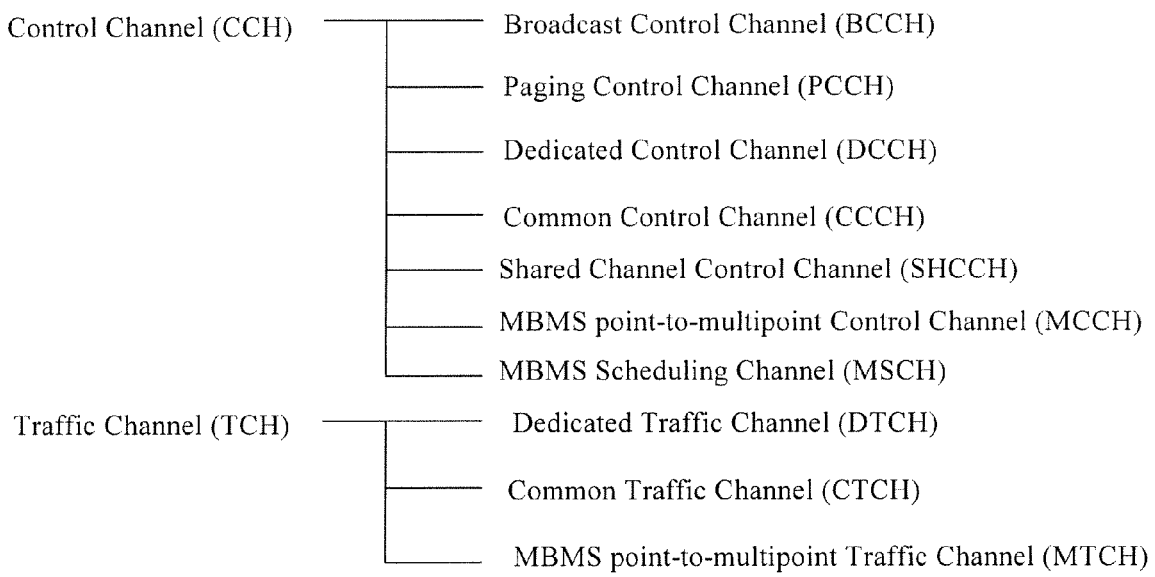
FIG. 3 illustrates logical channel structure.
Figure 4:
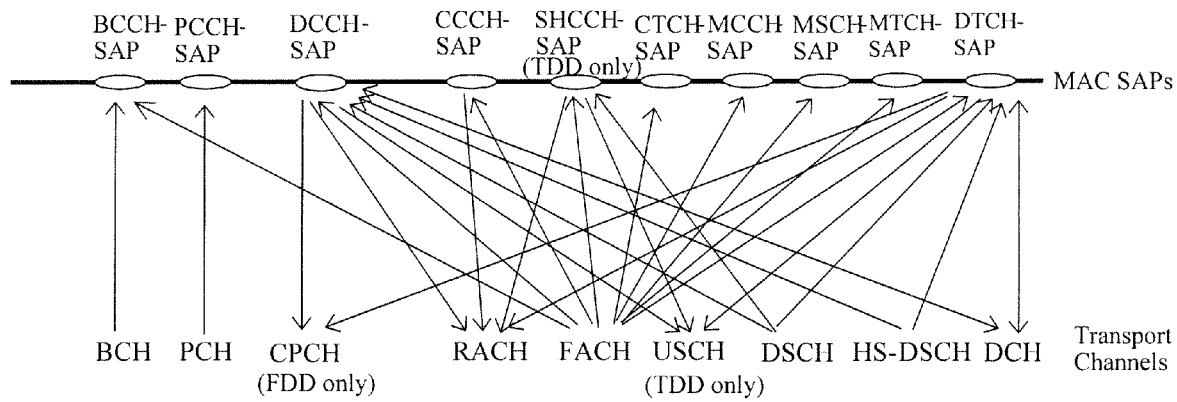
FIG. 4 illustrates possible mappings between logical channels and transport channels from the UE perspective.
Figure 5:
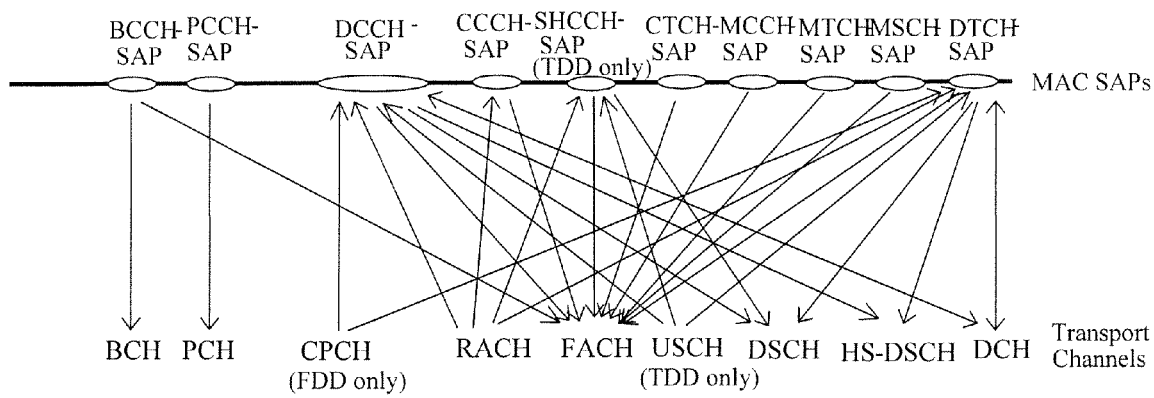
FIG. 5 illustrates possible mappings between logical channels and transport channels from the UTRAN perspective.
Figure 6:
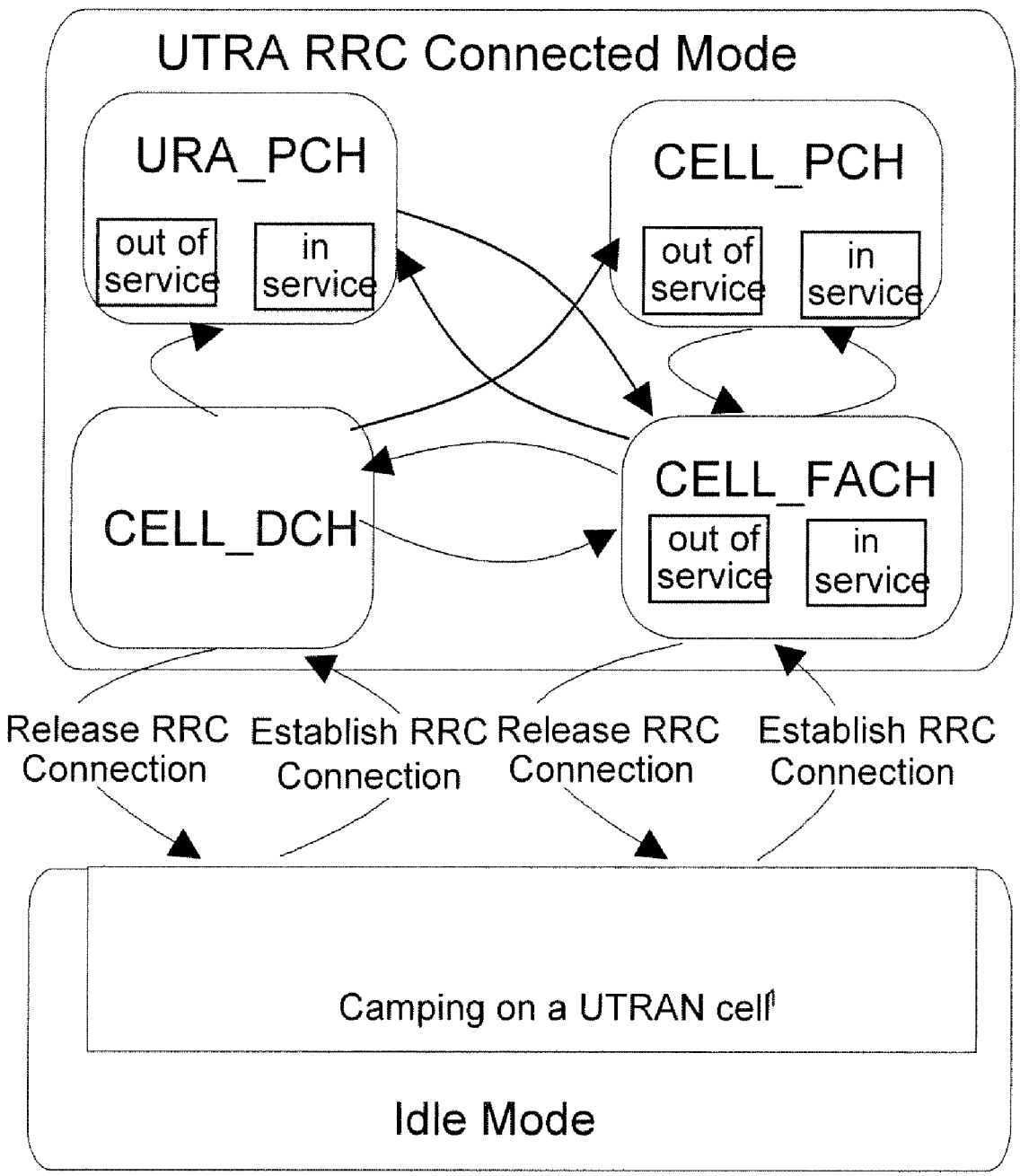
FIG. 6 illustrates possible UE state transitions.
Figure 7:
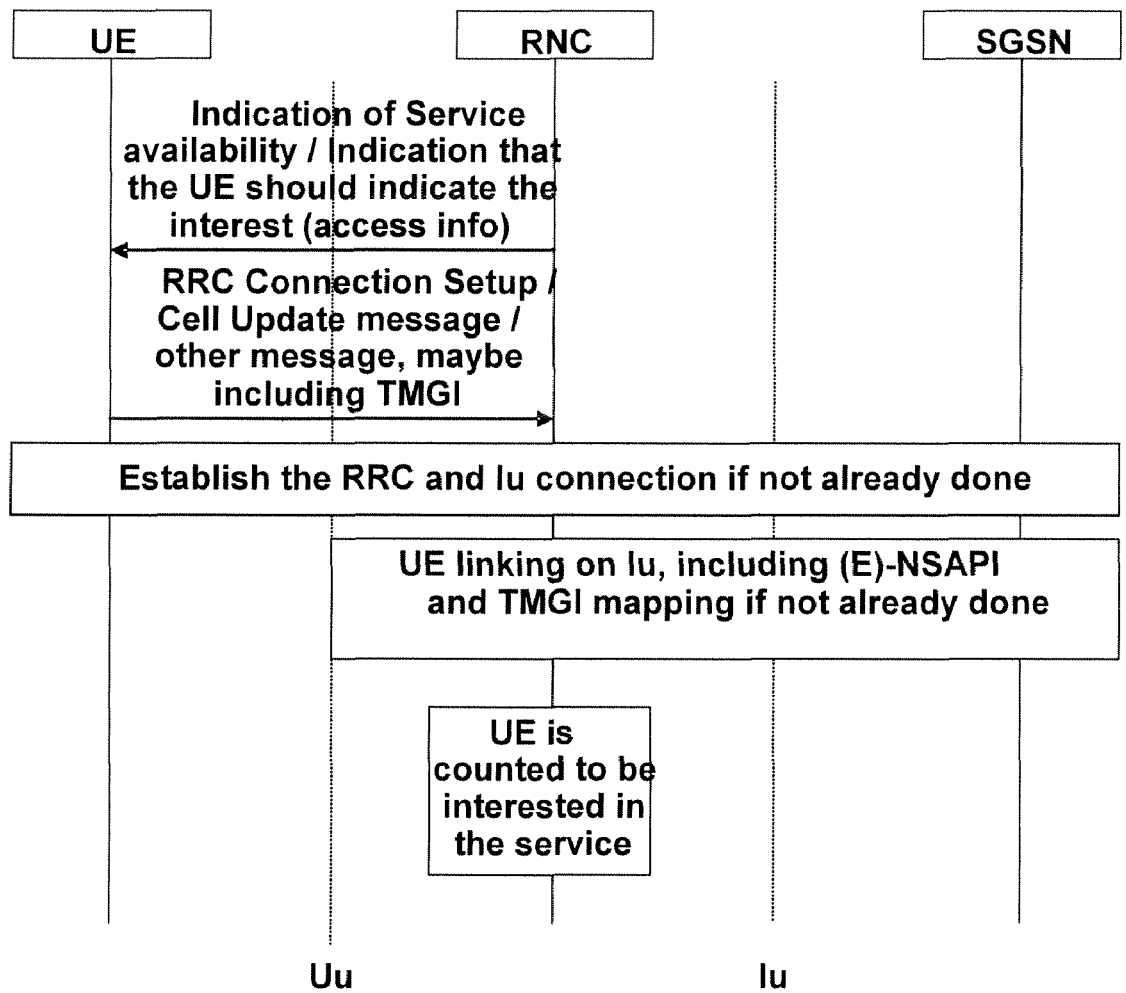
FIG. 7 illustrates a typical counting procedure.
Figure 8:
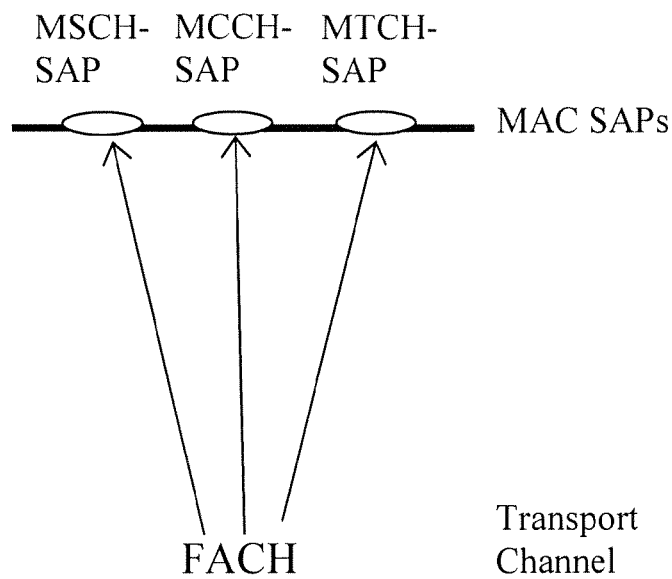
FIG. 8 illustrates mapping between logical channels and a transport channel as seen from the UE perspective.
Figure 9:
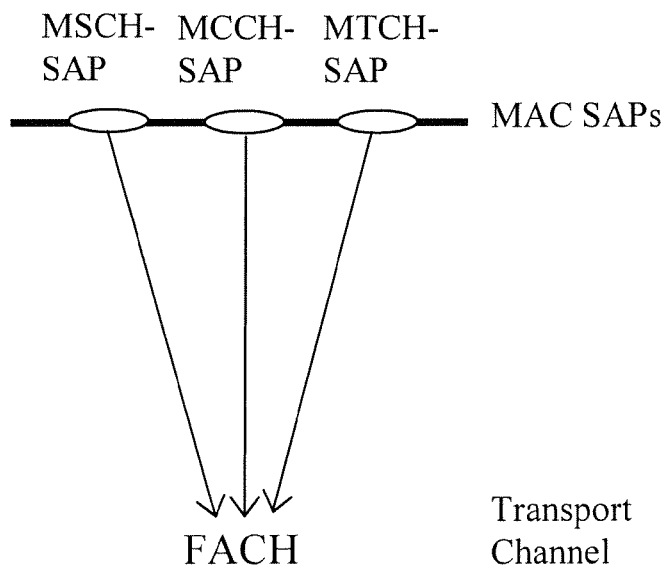
FIG. 9 illustrates mapping between logical channels and a transport channel as seen from the UTRAN perspective.
Figure 10:
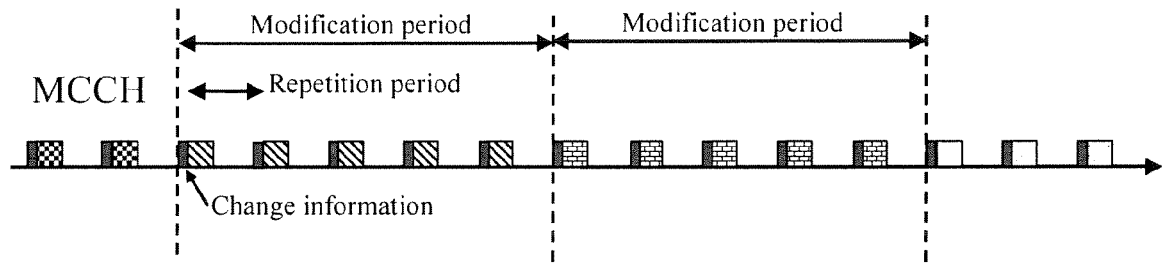
FIG. 10 illustrates a schedule with which the MBMS service information and radio bearer information is transmitted.
Figure 11:
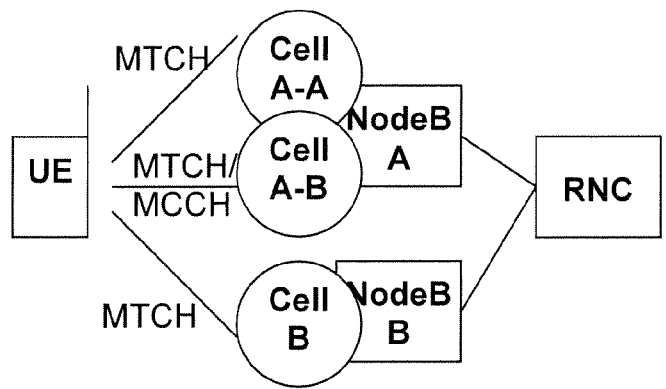
FIG. 11 illustrates a UE receiving MBMS service from several cells.
Figure 12:
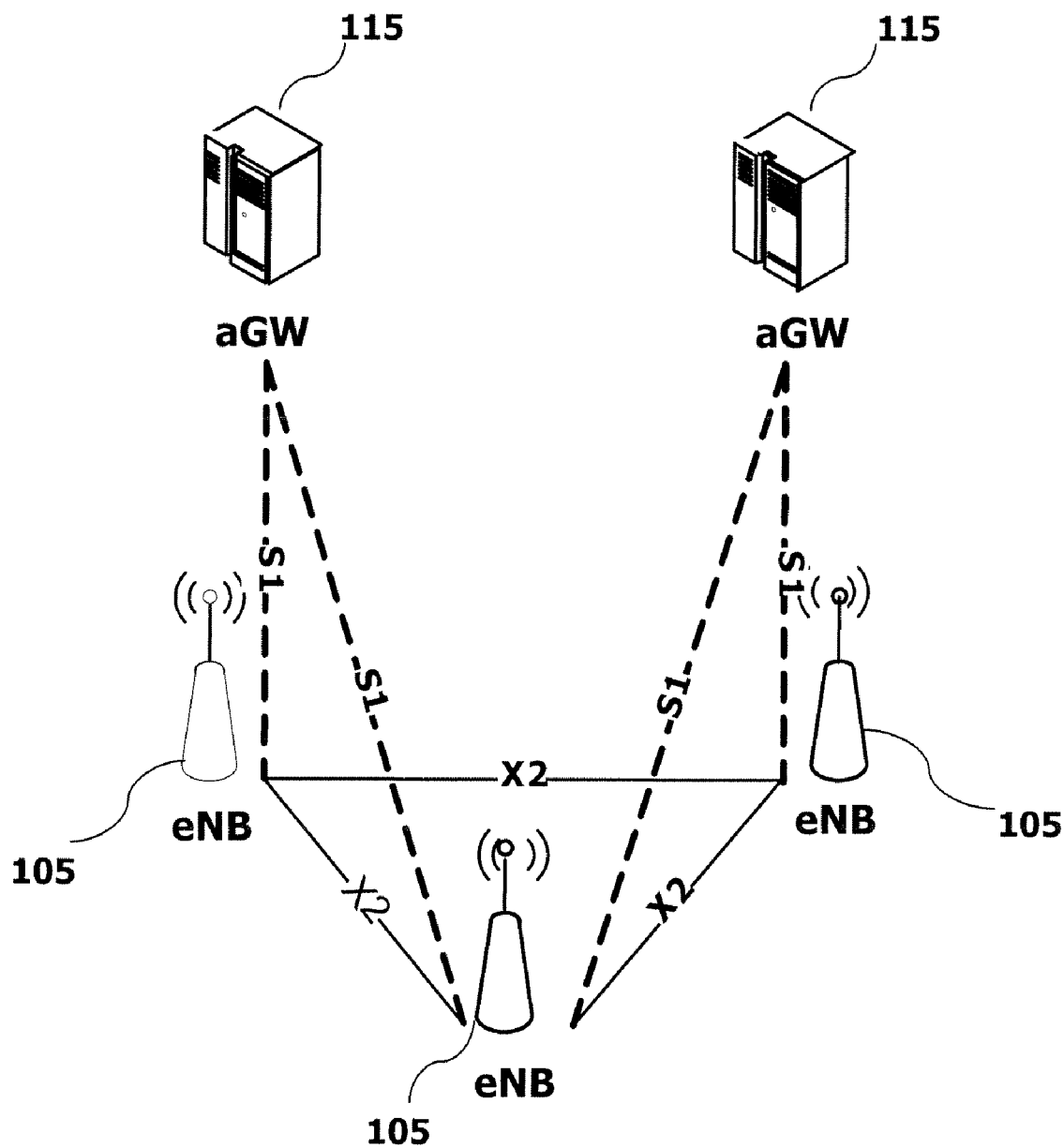
FIG. 12 illustrates the architecture of an LTE system.

The present invention relates to maintaining an order of data units during a handover procedure in a wireless communication system.

Reference will now be made in detail to the preferred embodiments of the present invention, examples of which are illustrated in the accompanying drawings. Wherever possible, the same reference numbers will be used throughout the drawings to refer to the same or similar parts.

The present invention is directed to principles of Long Term Evolution (LTE) mobility, and more particularly, to ensuring security during mobility. In accordance with the present invention, seamless handover such as for a voice over Internet protocol (VoIP), is distinguished from lossless handover such as for a transmission control protocol (TCP), for a downlink transmission.

In accordance with the present invention, packet data convergence protocol (PDCP) sequence numbers are included in downlink transmissions to allow a transmitter and receiver to maintain a counter value (COUNT-C) used as an input to a ciphering and deciphering algorithm. To ensure that a counter at the transmitter and receiver remain synchronized, and also to keep track of a PDCP PDU that has been counted in the transmitter but is lost and not received by the receiver, a sequence number (SN) such as an PDCP SN may be added to the PDCP PDU or derived. The sequence number preferably corresponds to the X least significant bits (X LSBs) of the COUNT-C value. Thus, the COUNT-C value comprises X LSBs, and the remaining Y most significant bits (Y MSBs). Upon the PDCP SN reaching a maximum value, the sequence number begins numbering again from 0, which is generally called a "wrap-around" of the sequence number. Therefore, the counter represented by the Y MSBs may be considered a "wrap-around counter".

Preferably, the receiver accepts PDCP PDUs carrying a sequence number arriving in sequence, wherein a next sequence number following the maximum possible sequence number corresponds to 0. Accordingly, when a last received sequence number is the maximum sequence number, and a next received PDCP SN does not correspond to a last SN plus one or 0, then all PDCP PDUs in between the last received sequence number and the next received sequence number are considered to have been lost.

In accordance with the present invention, when two PDCP PDUs carrying a sequence number arrive out of order, the receiver may consider that a certain number of wrap-arounds have occurred, and therefore the wrap-around counter in the receiver is increased, although this may not be similarly done in the transmitter. A similar situation occurs when a sequence number is altered, for example, due to residual errors not detected by a cyclic redundancy check (CRC). Generally, PDCP SNs following the reception of an altered sequence number are not received in sequence, and therefore a wrap-around and desynchronization of the wrap-around counter between the transmitter and receiver occurs.

In accordance with the present invention, a mechanism for detecting sequence number errors is provided. The mechanism comprises ignoring all PDCP PDUs received that have a PDCP SN expected to be received at least Max_Window sequence numbers after a last received PDCP SN. Thus, an out of sequence delivery, and most residual errors can be detected by the receiver, and therefore desynchronization of the wrap-around counter between the transmitter and receiver does not occur. A value of the parameter Max_Window may be fixed, or signaled to the UE during radio bearer (RB) setup. However, if more than Max_Window PDCP PDUs with an SN are lost, then all following PDCP PDUs may be ignored and the wrap-around counter is desynchronized.

Figure 13:
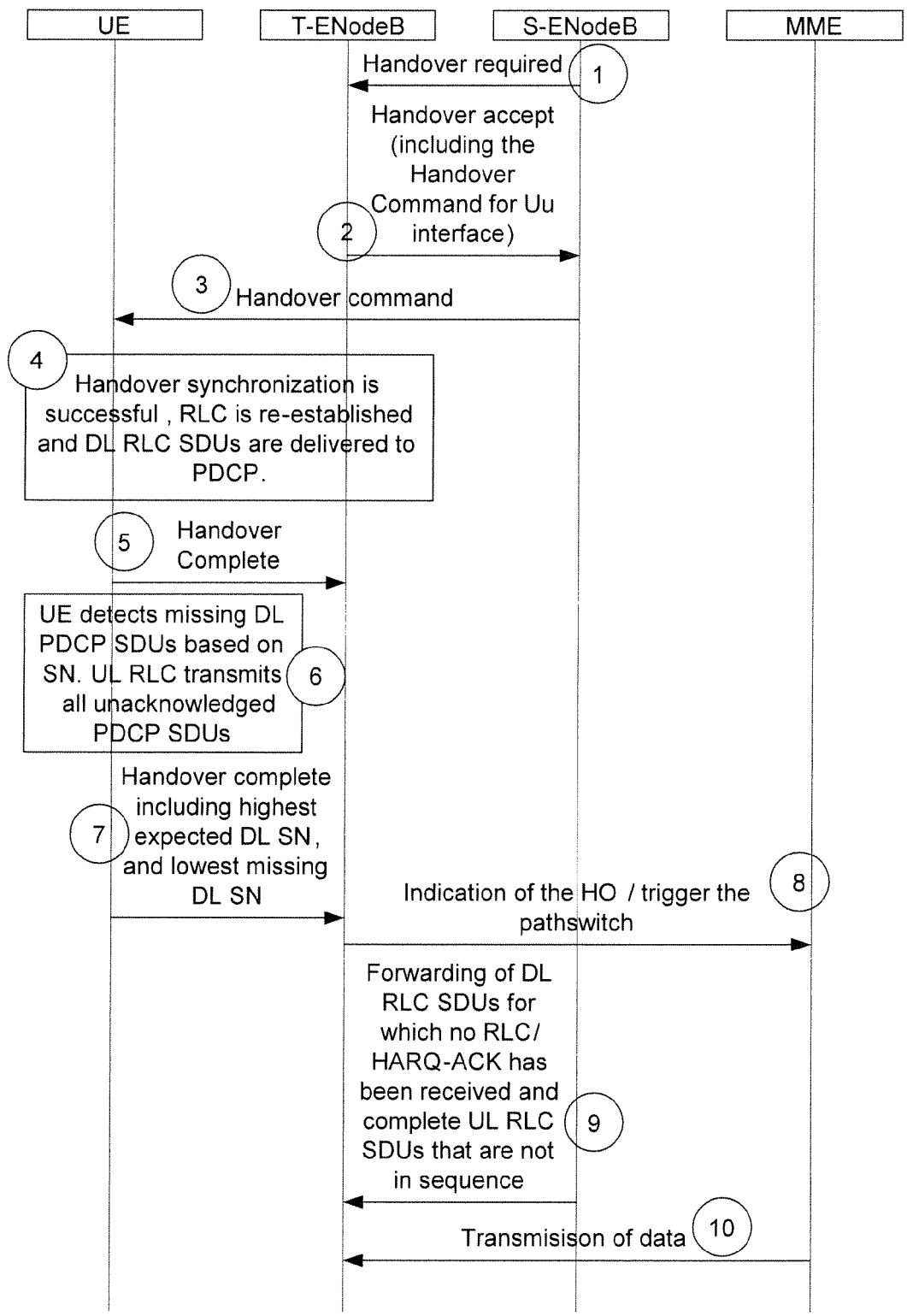
FIG. 13 illustrates a handover procedure in accordance with one embodiment of the present invention.
Figure 14:
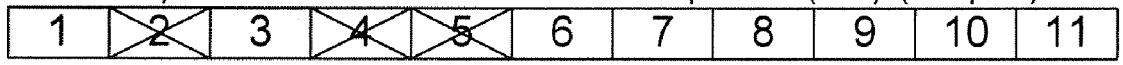
FIG. 14 illustrates a status of received, transmitted and confirmed data units having sequence numbers in accordance with one embodiment of the present invention.
Figure 14:
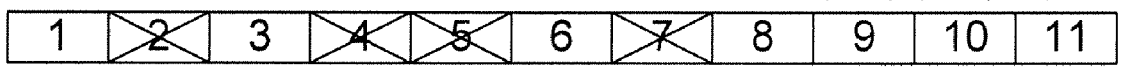
Figure 14:
Figure 14:
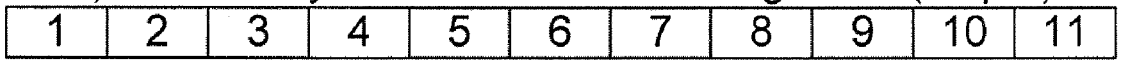

FIG. 13 illustrates a handover procedure in accordance with one embodiment of the present invention. FIG. 14 illustrates a status of received, transmitted and confirmed PDCP PDUs including sequence numbers in accordance with one embodiment of the present invention.

In accordance with the present invention, when a UE receives and accepts a handover command, as shown in step 3 of FIG. 13, and possibly after the UE has confirmed synchronization to a target cell, all complete SDUs available but not in sequence in the RLC layer are transmitted to the PDCP layer. Furthermore the RLC layer and all HARQ processes in the UE are reset. Thus, as shown in FIG. 14, the UE may completely receive some PDCP PDUs with SNs, while other PDCP PDUs with SNs that the ENodeB has attempted to transmit are not confirmed to be received by the UE, such as PDCP SNs 4, 8, 9 and 10, for example (see 4) of FIG. 14). Furthermore, although some PDCP PDUs with SNs may be received successfully in the UE, the ENodeB may not receive confirmation of the successful reception either from the HARQ entity or RLC entity (e.g. PDCP PDU with SN 9; see 3) of FIG. 14).

Referring to FIG. 14, an example of the difference in status in the ENodeB and UE at different points in time during a handover message is shown. In 1), a source ENodeB is shown at the moment when the source ENodeB sends a first message to a target ENodeB to request handover, and to reserve necessary resources. Here, reception of PDCP SNs 1 and 3 by the UE are confirmed, for example, at an RLC level or HARQ level. Moreover, although the transmission of PDCP PDUs with SNs 2, 4 and 5 by the ENodeB have already started, their reception by the UE has not yet been confirmed to the ENodeB. Accordingly, the source ENodeB may indicate to the target ENodeB a next PDCP SN to be used for transmission, i.e. PDCP SN 6 in the example. The source ENode B may also indicate to the target ENode B a timestamp and an expected data rate/sequence number rate, such that the target ENodeB can deduce the SN it may use for a first transmission when transmission to the UE begins. Thus, the target ENodeB can determine a PDCP_SN_TXed_Max, which corresponds to a maximum PDCP SN already transmitted. Preferably, the target ENodeB does not use a SN lower or equal to the PDCP_SN_TXed_Max for transmitting an IP packet that has not been previously transmitted to the UE to avoid desynchronizing the wrap-around counter.

In 2) and 3), it is shown how the context in the source ENodeB changes during the handover procedure during the different steps of the handover. In 4), a status of the received PDCP PDUs with a SN in the UE is shown. Here, it is shown that that PDCP PDUs with SNs 1, 2, 3, 5, 6, 7 and 9 are received by the UE although at the same moment, the ENodeB only considers PDCP PDUs with SNs 1, 2, 3, 5, 6, 7 to be received by the UE. With regard to the PDCP PDUs with SNs 4, 8, 9 and 10, the ENodeB can not know whether they have been received by the UE because although they have been transmitted at least once to the UE, they have not been acknowledged, on an RLC and/or H-ARQ level.

In accordance with one embodiment of the present invention, seamless handover is considered. For the case of seamless handover, the UE PDCP preferably delivers all downlink (DL) PDCP SDUs immediately to higher layers. The UE may then indicate in a Handover Complete message the last received, or next expected, PDCP SN in the downlink such that the target ENodeB may use this information to start transmission of the newly received data as soon as it arrives.

Alternatively, the target ENodeB may use information regarding the highest PDCP SN used in the downlink, which may be received from the source ENodeB in step 1 of FIG. 13. The target ENode B then applies a fixed offset to the information and indicates the fixed offset to the source ENodeB in step 2 of FIG. 13, for example. Accordingly, the source ENodeB is able to stop transmission beyond the fixed offset. Moreover, the target ENodeB may use the sequence number corresponding to the fixed offset as the maximum PDCP SN already transmitted (PDCP_SN_TXed_Max), and can use a next or higher sequence number for transmitting IP packets that have not yet been initiated safely without risk of desynchronizing the wrap-around counter.

After the source ENodeB determines that the UE has performed the handover, such as when the source ENodeB receives a HARQ acknowledgement (ACK) or an RLC acknowledgment of the handover message, as shown in step 9 of FIG. 13, the source ENodeB may inform the target ENodeB of the last used PDCP SN. This is preferable when no data is transmitted after the handover to ensure that the target ENodeB can report the exact value of the last transmitted PDCP SN to a next target ENodeB in a future handover operation.

Afterward, the source ENodeB or target ENodeB discards all PDCP SDUs for which a transmission has already been attempted. Accordingly, there may be no need for a specific UE behavior at reordering because the only impact may be a gap in the SNs of the PDCP.

In accordance with another embodiment of the present invention, lossless handover is considered. For the case of lossless handover, the source ENodeB preferably forwards all PDCP PDUs/SDUs that have been transmitted and assigned a SN to the target ENodeB such that they can be transmitted to the UE. The UE may indicate in a Handover Complete message a PDCP SN after a highest PDCP SN received (PDCP_SN_Miss_max). The SN before the PDCP_SN_Miss_max value may then be used by the target ENodeB as a value for the maximum PDCP SN already transmitted (PDCP_SN_TXed_Max).

Similarly to seamless handover, in lossless handover the target ENodeB may use information regarding the highest PDCP SN used in the downlink received from the source ENodeB in step 1 of FIG. 13. The target ENode B may then apply a fixed offset to the information and indicates the fixed offset to the source ENode B in step 2 of FIG. 13, for example. Accordingly, the source ENodeB is able to stop transmission beyond the fixed offset. Moreover, the target ENodeB may use the sequence number corresponding to the fixed offset as the maximum PDCP SN already transmitted (PDCP_SN_TXed_Max) and can use a next or higher SN for transmitting IP packets that have not yet been initiated safely without risk of desynchronizing the wrap-around counter.

A value of the lowest PDCP SN not yet received (PDCP_SN_Miss_min) may also be indicated, or may be determined by the target ENodeB and UE as the PDCP_SN_Miss_max and a window size parameter HO_Reordering_window_size, which for example may be indicated at RB setup/reconfiguration, indicated in the handover command, or be a fixed value. This SN may be stored by the target ENodeB as the PDCP_SN_TXed_Min.

In order to not desynchronize the wrap-around counter, the target ENodeB preferably does not transmit an IP packet for which a PDCP SN has been allocated, wherein the value of the SN is not between PDCP_SN_TXed_Min and PDCP_SN_TXed_Max (where the values PDCP_SN_TXed_Min and PDCP_SN_TXed_Max are allowed). In the target ENodeB, the PDCP PDU/SDUs forwarded over the X2 interface for which a transmission has been attempted preferably arrives in sequence. If delivery over the X2 interface is out of sequence, the target ENodeB can detect the out of sequence delivery either by decoding the PDCP header, or by recognizing the COUNT-C or PDCP SN added to the forwarded PDCP PDU/SDU. Accordingly, the target ENodeB can discard the out of sequence PDCP PDU/SDU, and therefore, the UE will not receive a PDCP PDU with a SN that is not higher than a previously-received PDCP SN.

In accordance with the present invention, the target ENodeB preferably transmits PDCP PDUs containing data from PDCP SDUs for which transmission has been attempted prior to transmitting PDCP SDUs delivered from the aGW/source ENodeB for which transmission has not been attempted. This operation is preferable in the case of handover, wherein during data transfer there is preferably some data buffered in the source ENodeB to be forwarded to the target ENodeB because the switch of the transport is normally triggered only when the handover is confirmed in the target ENodeB.

After the source ENodeB detects that the UE has performed the handover, such as when the source ENodeB receives an HARQ acknowledgement ACK or an RLC acknowledgement of the handover message in step 9 of FIG. 13, the source ENodeB preferably reports to the target ENodeB the last used PDCP SN. This is preferable when no data is transmitted after the handover to ensure that the target ENodeB can report the exact value of the last transmitted PDCP SN, as in step 1 of FIG. 13, to a next target ENodeB of a future handover operation.

In accordance with the present invention, error cases will be described. In one example of an error case, loss of one PDCP PDU/SDU over the X2 interface may occur. To the address the error, the UE for example, can transmit all PDUs/SDUs with a lower PDCP SN than a currently received PDCP SN to higher layers even if all PDCP SNs have not been received. Given that the target ENodeB preferably sends PDCP PDUs with PDCP SNs in increasing order to the UE, the UE's operation for addressing the error will not be problematic.

In another example of an error case, a latest PDCP SN for which transmission has been attempted does not correspond to a latest-received PDCP SN in the UE. To address the error, the target ENodeB may implement an operation wherein if the PDCP PDU is not received before a timer expires, the target ENodeB may remove the SN of the packet and send the packet out of order. The target ENodeB may also discard the PDCP PDU in this particular case. Alternatively, to address the error, a highest SN may be systematically sent from the source ENodeB to the target ENodeB. Accordingly, the target ENodeB is made aware of the highest PDCP SN and will know whether there is a reason to wait for the reception of the highest PDCP SN.

In view of the above, the following procedure may be applied in accordance with the present invention. Preferably, the PDCP layer in the UE expects missing PDCP PDUs including a sequence number to arrive in sequence. For example, in 4) of FIG. 14, the UE expects to first receive the PDCP PDU with SN 4, followed by the PDCP PDU with SN 8 and PDCP PDU with SN 10 sequentially. Thus, as soon as a sequence number higher or equal to PDCP_SN_Miss_min is received, the PDCP layer considers all PDCP PDUs that have not yet been delivered to higher layers with a SN smaller than the received SN, and all in-sequence PDCP SNs following can be delivered to higher layers. A detailed procedure is shown in FIG. 15.

Figure 15:
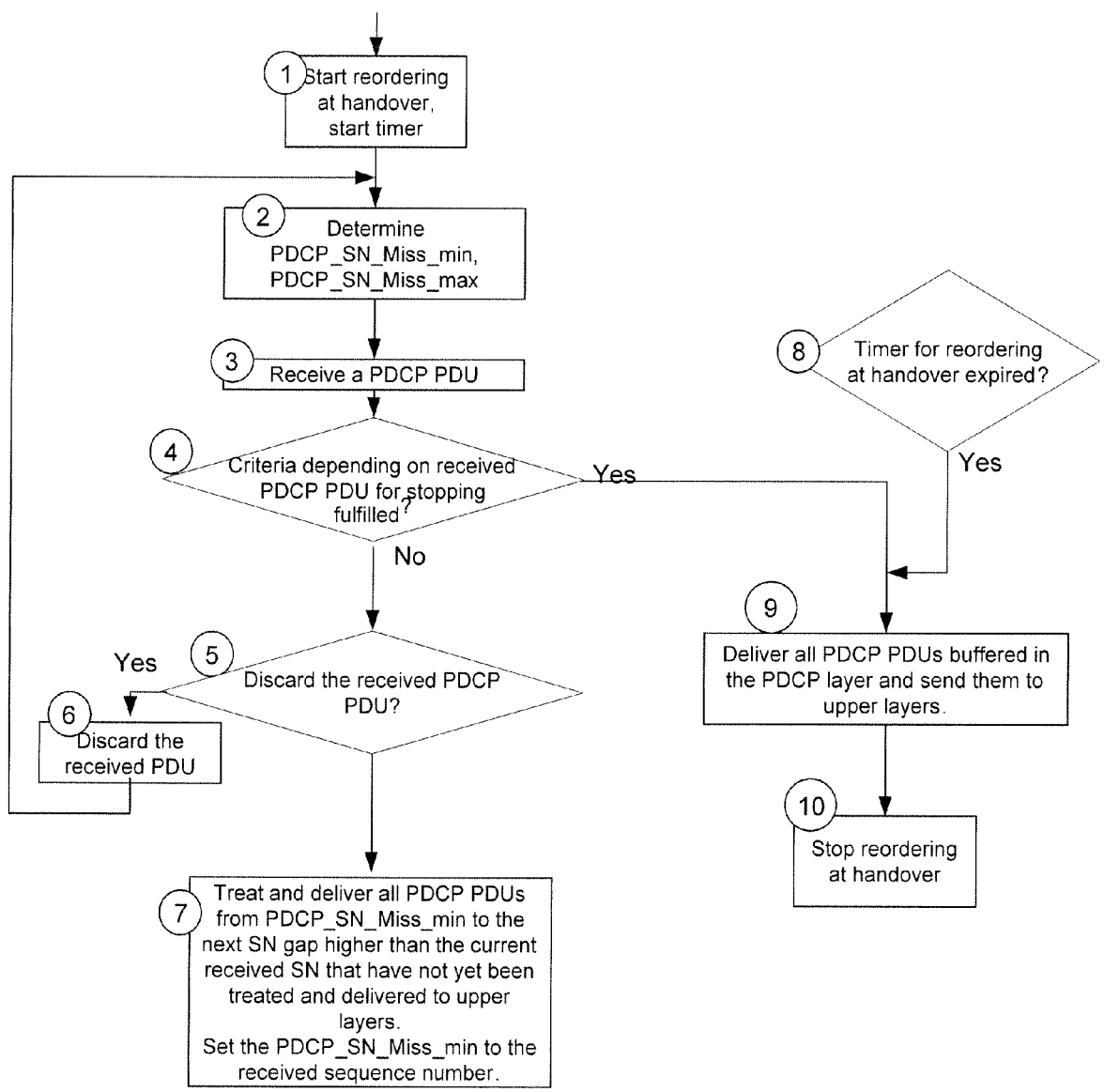
FIG. 15 illustrates a method for maintaining an order of received data units in a UE during handover in accordance with one embodiment of the present invention.

FIG. 15 illustrates a method for operating a UE at handover for downlink PDCP PDUs with a sequence number in accordance with one embodiment of the present invention. Preferably, when a handover command is received by the UE, the UE initiates a reordering procedure at handover (1). The UE then determines a PDCP SN following the highest received PDCP SN and stores the value as PDCP_SN_Miss_max (2). The UE may also determine C, for example, as a smallest missing PDCP SN (PDCP_SN_Miss_min), or as PDCP_SN_Miss_max-HO_Reordering_window_size, wherein the value of HO_Reordering_window_size can either be fixed, or received by the UE from the ENodeB during the handover or at RB setup.

Thereafter, the UE receives a PDCP PDU from the ENodeB (3) and determines whether the reordering procedure should continue to proceed (4). In accordance with the present invention, the UE may stop the reordering procedure when one of the following criteria is realized:
  A) (PDCP_SN_Miss_min≦Current PDCP PDU SN<PDCP_SN_Miss_max) is not satisfied;
  B) PDCP_SN_Miss_max+offset≦Current PDCP PDU SN;
  C) Timer started at beginning of reordering procedure expires; and
  D) PDCP control PDU or bit indicating stop of reordering process is received If the received PDCP PDU has already been received (5), the PDU is discarded and waits for a next PDCP PDU to be received (6). For the PDUs that are not discarded, the UE identifies all PDCP PDUs from PDCP_SN_Miss_min on with SNs that have been received in order with no SN missing. The identified PDCP PDUs are then treated (e.g. header decompressed) and have their content delivered to higher layers. Preferably, the PDCP_SN_Miss_min is set to the SN of a currently received PDCP PDU because a PDU may be received by the ENodeB that is already received by the UE (7).

Independent of a trigger from a received PDCP PDU, another trigger may be necessary to trigger the stop of the reordering procedure at handover, such as when IP packets contained in PDCP PDUs that have not been transmitted by the source ENodeB are lost over the X2 interface. Accordingly, it is preferable to start a timer at the start of the handover procedure. At expiry of the timer (8), the UE will consider all PDCP PDUs with SNs having been received until then to be treatable and deliverable to higher layers (9). In one embodiment, the timer may be restarted each time a PDCP PDU in the downlink is received by the UE. Thereafter, the reordering procedure is stopped at handover (10).

Referring to FIG. 14 for example, the source ENodeB would forward at least the PDCP PDUs with SNs 4, 8, 9 and 10 to the UE. After receiving the PDCP PDU with SN 4, the UE would then deliver all PDCP PDUs with SNs 5, 6 and 7. Thereafter, after the receiving the PDCP PDUs with SNs 8, 9 and 10, the UE would then treat these PDUs and transmit their content to higher layers.

Figure 16:
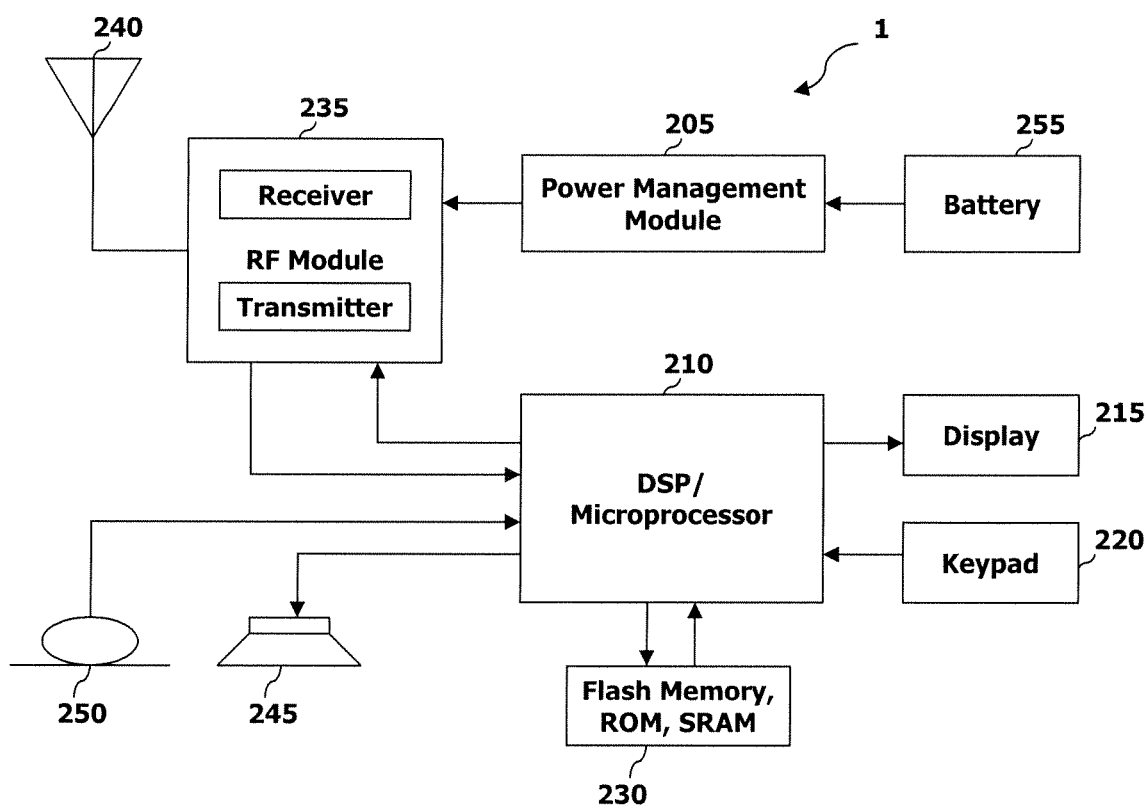
FIG. 16 illustrates a block diagram of a mobile station (MS) or UE in accordance with one embodiment of the present invention.

FIG. 16 illustrates a block diagram of a mobile station (MS) or UE 1 in accordance with the present invention. The UE 1 includes a processor (or digital signal processor) 210, RF module 235, power management module 205, antenna 240, battery 255, display 215, keypad 220, memory 230, speaker 245 and microphone 250.

A user enters instructional information, such as a telephone number, for example, by pushing the buttons of a keypad 220 or by voice activation using the microphone 250. The microprocessor 210 receives and processes the instructional information to perform the appropriate function, such as to dial the telephone number. Operational data may be retrieved from the memory module 230 to perform the function. Furthermore, the processor 210 may display the instructional and operational information on the display 215 for the user's reference and convenience.

The processor 210 issues instructional information to the RF module 235, to initiate communication, for example, transmits radio signals comprising voice communication data. The RF module 235 comprises a receiver and a transmitter to receive and transmit radio signals. An antenna 240 facilitates the transmission and reception of radio signals. Upon receiving radio signals, the RF module 235 may forward and convert the signals to baseband frequency for processing by the processor 210. The processed signals would be transformed into audible or readable information outputted via the speaker 245, for example. The processor 210 also includes the protocols and functions necessary to perform the various processes described herein.

It will be apparent to one skilled in the art that the mobile station 1 may be readily implemented using, for example, the processor 210 or other data or digital processing device, either alone or in combination with external support logic. Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, and the like.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for maintaining an order of received data units during a re-establishment procedure in a wireless communication system, the method comprising:
   receiving a plurality of data units from a source base station according to a sequence prior to re-establishment to a target base station, wherein each data unit includes a sequence number;
   receiving, from the target base station, at least one data unit having a sequence number after re-establishment;
   delivering to a higher layer all data units received from the source base station prior to re-establishment and having sequence numbers smaller than the sequence number of the at least one data unit received from the target base station after re-establishment; and
   delivering, to a higher layer, all data units received prior to starting the re-establishment procedure which are available sequentially, wherein the sequentially available data units respectively have consecutive sequence numbers that are greater than, and immediately sequential to, the sequence number of the at least one data unit received from the target base station after re-establishment.

2. The method of claim 1, further comprising:
   starting a timer at the start of the re-establishment procedure; and
   delivering the data units to the higher layer when the timer expires.

3. The method of claim 1, further comprising:
   starting a timer at the start of the re-establishment procedure; and
   delivering the data units to the higher layer when the timer expires.

4. The method of claim 1, wherein the data units are delivered to the higher layer upon receiving an indication from at least one of the source base station and the target base station to deliver the data units.

5. A method for maintaining an order of received data units during a re-establishment procedure in a wireless communication system, the method comprising:
   receiving a plurality of data units according to a sequence prior to starting the re-establishment procedure, wherein each data unit includes a sequence number;
   receiving at least one data unit having a sequence number after starting the re-establishment procedure;
   delivering to a higher layer all data units received prior to starting the re-establishment procedure and having sequence numbers smaller than a sequence number of the at least one data unit received after starting the re-establishment procedure;
   delivering, to a higher layer, all data units received before starting the re-establishment procedure which are available sequentially, wherein the sequentially available data units respectively have consecutive sequence numbers that are greater than, and immediately sequential to, the sequence number of the at least one data unit received after starting the re-establishment procedure.

6. The method of claim 5, further comprising:
   starting a timer at the start of the re-establishment procedure; and
   delivering the data units to the higher layer when the timer expires.

7. The method of claim 5, further comprising:
   starting a timer at the start of the re-establishment procedure; and
   delivering the data units to the higher layer when the timer expires.

8. The method of claim 5, wherein the data units are delivered to the higher layer upon receiving an indication to deliver the data units.

9. A method for maintaining an order of received data units during a re-establishment procedure in a wireless communication system, the method comprising:
   receiving a plurality of data units according to a sequence prior to starting the re-establishment procedure, wherein each data unit includes a sequence number;
   receiving at least one data unit having a sequence number after starting the re-establishment procedure;
   starting a timer at the start of the re-establishment procedure;
   delivering to a higher layer all data units received prior to starting the re-establishment procedure and having sequence numbers smaller than a sequence number of the at least one data unit received after starting re-establishment procedure when the timer expires; and
   delivering all data units received before starting the re-establishment procedure which are available sequentially to a higher layer when the timer expires, wherein a sequentially available data unit has a sequence number immediately sequential to a sequence number of a next available data unit or the sequence number of the at least one data unit received after starting re-establishment procedure.

10. A method for maintaining an order of data units during a re-establishment procedure in a wireless communication system, the method comprising:
    transmitting a plurality of data units from a source base station to a mobile terminal according to a sequence prior to re-establishment to a target base station, wherein each data unit includes a sequence number;
    informing the target base station of a highest sequence number of a data unit previously transmitted by the source base station;
    transmitting at least one data unit having a sequence number from the target base station to the mobile terminal after re-establishment,
    wherein the at least one data unit is transmitted from the target base station with regard to the highest sequence number of the data unit previously transmitted by the source base station;

forwarding from the source base station to the target base station all unacknowledged data units previously transmitted by the source base station to the mobile terminal;

transmitting at least one forwarded data unit from the target base station to the mobile terminal; and transmitting the at least one data unit from the target base station with a sequence number greater than the highest sequence number of the unacknowledged data units previously transmitted by the source base station, wherein the at least one data unit has not been previously transmitted.

11. The method of claim 10, wherein the target base station receives information regarding the highest sequence number after re-establishment from at least one of:

the mobile terminal; and the source base station.

12. The method of claim 10, wherein the data units forwarded from the source base station are received by the target base station in sequential order according to their respective sequence numbers.

13. The method of claim 12, wherein the target base station discards a data unit having a sequence number that is out-of-sequence with the sequential order of the data units forwarded from the source base station.

14. The method of claim 10, wherein the target base station transmits to the mobile terminal the at least one forwarded data unit previously transmitted by the source base station before transmitting the at least one data unit not previously transmitted.

15. The method of claim 10, wherein the target base station transmits data units to the mobile terminal in a sequentially increasing order according to their respective sequence numbers.

16. The method of claim 10, further comprising informing the target base station of a latest sequence number of a data unit previously received by the mobile terminal.

17. The method of claim 16, further comprising:

determining in the target base station that a sequence number of a forwarded data unit for transmission to the mobile terminal does not sequentially correspond with the latest sequence number of the data unit previously received by the mobile terminal; and removing the sequence number of the forwarded data unit and transmitting the forwarded data unit out-of-sequence from the target base station to the mobile terminal if a data unit sequentially corresponding with the latest sequence number of the data unit previously received by the mobile terminal is not received by the target base station before a predetermined time elapses.

18. The method of claim 16, further comprising:

determining in the target base station that a sequence number of a forwarded data unit for transmission to the mobile terminal does not sequentially correspond with the latest sequence number of the data unit previously received by the mobile terminal; and discarding the forwarded data unit.

19. A method for maintaining an order of data units during a re-establishment procedure in a wireless communication system, the method comprising:

transmitting a plurality of data units according to a sequence from a source base station to a mobile terminal, wherein each data unit includes a sequence number;

transmitting a re-establishment request from a source base station to a target base station; and transmitting from the source base station to the target base station information related to an appropriate sequence number to be used by the target base station for transmission, wherein the target base station determines the appropriate sequence number for transmission using the information from the source base station;

forwarding from the source base station to the target base station all unacknowledged data units previously transmitted by the source base station to the mobile terminal;

transmitting at least one forwarded data unit from the target base station to the mobile terminal; and transmitting at least one data unit from the target base station with the appropriate sequence number, wherein the appropriate sequence number is a sequence number greater than the highest sequence number of the unacknowledged data units previously transmitted by the source base station, and wherein the at least one data unit has not been previously transmitted.

20. The method of claim 19, wherein the information comprises one of:

a next sequence number to be used by the target base station for transmission;

a highest sequence number of a data unit previously transmitted by the source base station; and a timestamp and an expected data rate/sequence number rate.

* * * * *